US009819677B2

United States Patent
Nice et al.

(10) Patent No.: US 9,819,677 B2
(45) Date of Patent: Nov. 14, 2017

(54) SUPPLEMENTING BIOMETRIC IDENTIFICATION WITH DEVICE IDENTIFICATION

(71) Applicant: Microsoft Technology Licensing, LLC, Redmond, WA (US)

(72) Inventors: Nir Nice, Kfar Veradim (IL); Eyal Krupka, Shimshit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/186,630

(22) Filed: Jun. 20, 2016

(65) Prior Publication Data

US 2016/0294825 A1 Oct. 6, 2016

Related U.S. Application Data

(63) Continuation of application No. 12/970,100, filed on Dec. 16, 2010, now Pat. No. 9,436,816.

(51) Int. Cl.
*H04L 29/06* (2006.01)
*G06F 21/32* (2013.01)
*G06Q 50/26* (2012.01)

(52) U.S. Cl.
CPC ......... *H04L 63/0861* (2013.01); *G06F 21/32* (2013.01); *H04L 63/101* (2013.01); *H04L 63/102* (2013.01); *G06Q 50/265* (2013.01)

(58) Field of Classification Search
CPC .. G07F 17/32; G06Q 20/40; G06Q 20/40145; G06Q 30/06; G06Q 20/20; G07C 9/00087; G07C 9/00111
See application file for complete search history.

(56) References Cited

U.S. PATENT DOCUMENTS 6,624,739 B1 * 9/2003 Stobbe ............... G07C 9/00087
235/382
6,838,989 B1 * 1/2005 Mays ................. G06K 19/0723
340/572.1

(Continued)

OTHER PUBLICATIONS

"Facial & Fingerprint Time Attendance and Access Control Sistem", Retrieved from <<http://web.archive.org/web/20111203025708/http://www.access-control.cc/face.html>>, Retrieved Date: Sep. 28, 2010, 2 Pages.

(Continued)

*Primary Examiner* — James Yang
(74) *Attorney, Agent, or Firm* — Cooper Legal Group, LLC

(57) ABSTRACT

A computer may identify an individual according to one or more biometrics based on various physiological aspects of the individual, such as metrics of various features of the face, gait, fingerprint, or voice of the individual. However, biometrics are often computationally intensive to compute, inaccurate, and unable to scale to identify an individual among a large set of known individuals. Therefore, the biometric identification of an individual may be supplemented by identifying one or more devices associated with the individual (e.g., a mobile phone, a vehicle driven by the individual, or an implanted medical device). When an individual is registered for identification, various device identifiers of devices associated with the individual may be stored along with the biometrics of the individual. Individuals may then be identified using both biometrics and detected device identifiers, thereby improving the efficiency, speed, accuracy, and scalability of the identification.

20 Claims, 8 Drawing Sheets

(56) References Cited

U.S. PATENT DOCUMENTS

| | | |
|---|---|---|
| 7,183,895 B2 | 2/2007 | Bazakos et al. |
| 2006/0197838 A1* | 9/2006 | Yamakita ................ G06K 1/18 348/169 |
| 2006/0200683 A1 | 9/2006 | King |
| 2007/0079137 A1 | 4/2007 | Tu |
| 2007/0200916 A1 | 8/2007 | Han |
| 2008/0024271 A1 | 1/2008 | Oberman et al. |
| 2008/0159601 A1 | 7/2008 | Alberth et al. |
| 2009/0167492 A1* | 7/2009 | Madafferi .......... G07C 9/00158 340/5.82 |
| 2010/0178903 A1 | 7/2010 | Tofighbakhsh et al. |
| 2010/0201498 A1* | 8/2010 | Griffin ................... G06F 21/32 340/10.52 |

OTHER PUBLICATIONS

"Final Office Action Issued in U.S. Appl. No. 12/970,100", dated Jun. 14, 2013, 27 Pages.
"Final Office Action Issued in U.S. Appl. No. 12/970,100", dated Jun. 10, 2014, 28 Pages.
"Final Office Action Issued in U.S. Appl. No. 12/970,100", dated Jun. 29, 2015, 32 Pages.
"Non Final Office Action Issued in U.S. Appl. No. 12/970,100", dated Nov. 12, 2014, 29 Pages.
"Non Final Office Action Issued in U.S. Appl. No. 12/970,100", dated Dec. 18, 2013, 29 Pages.
"Non Final Office Action Issued in U.S. Appl. No. 12/970,100", dated Dec. 19, 2012, 25 Pages.
"Non Final Office Action Issued in U.S. Appl. No. 12/970,100", dated Jan. 8, 2016, 27 Pages.
"Notice of Allowance Issued in U.S. Appl. No. 12/970,100", dated Apr. 29, 2016, 9 Pages.
"First Office Action and Search Report Issued in Chinese Patent Application No. 201110440146.4", dated Feb. 14, 2014, 12 Pages.
"Notice of Allowance Issued in Chinese Patent Application No. 201110440146.4", dated Nov. 5, 2015, 4 Pages.
"Reply to First Office Action Issued in Chinese Patent Application No. 201110440146.4", Filed Date: Jun. 30, 2014, 20 Pages.
"Reply to Second Office Action and Search Report Issued in Chinese Patent Application No. 201110440146.4", Filed Date: Dec. 30, 2014, 19 Pages.
"Reply to Third Office Action and Search Report Issued in Chinese Patent Application No. 201110440146.4", Filed Date: Jul. 6, 2015, 19 Pages.
"Second Office Action Issued in Chinese Patent Application No. 201110440146.4", dated Oct. 15, 2014, 11 Pages.
"Third Office Action Issued in Chinese Patent Application No. 201110440146.4", dated Apr. 20, 2015, 6 Pages.
Hazen, et al., "Towards Robust Person Recognition on Handheld Devices Using Face and Speaker Identification Technologies", In Proceedings of the 5th international Conference on Multimodal Interfaces, Nov. 5, 2003, pp. 289-292.
Hulsebosch, et al., "Enhancing Face Recognition with Location Information", In Proceedings of Third International Conference on Availability, Reliability and Security, Mar. 4, 2008, pp. 397-403.
Sharifi, et al., "Audience Recognition in Public Spaces", Retrieved from <<http://portfolio.ecs.soton.ac.uk/18/3/irp-report.pdf>>, Retrieved Date: Sep. 24, 2010, 14 Pages.
Reply Non-Final Office Action cited in U.S. Appl. No. 12/970,100 dated Mar. 19, 2013, 28 pgs.
Reply Final Office Action cited in U.S. Appl. No. 12/970,100 dated Sep. 16, 2013, 19 pgs.
Reply Non-Final Office Action cited in U.S. Appl. No. 12/970,100 dated Mar. 18, 2014, 21 pgs.
Reply Final Office Action cited in U.S. Appl. No. 12/970,100 dated Aug. 12, 2014, 19 pgs.
Reply Non-Final Office Action cited in U.S. Appl. No. 12/970,100 dated Mar. 12, 2015, 18 pgs.
Reply Final Office Action cited in U.S. Appl. No. 12/970,100 dated Nov. 30, 2015, 17 pgs.
Reply Non-Final Office Action cited in U.S. Appl. No. 12/970,100 dated Apr. 8, 2016, 18 pgs.

* cited by examiner

SUPPLEMENTING BIOMETRIC IDENTIFICATION WITH DEVICE IDENTIFICATION

CROSS-REFERENCE TO RELATED APPLICATIONS

This application is a continuation of, and claims priority under 35 U.S.C. §120 to, U.S. patent application Ser. No. 12/970,100, entitled "SUPPLEMENTING BIOMETRIC IDENTIFICATION WITH DEVICE IDENTIFICATION," filed on Dec. 16, 2010, which incorporated herein by reference.

BACKGROUND

Within the field of computing, many scenarios involve an identification of an individual using one or more biometrics. As a first example, a camera may capture an image or video recording of the individual, may evaluate various visible aspects of the individual (e.g., facial features, body shape, and gait), and may generate a set of visible biometrics that represent the individual. As a second example, a microphone may capture and evaluate the voice of the individual, and various biometrics may be identified based on the acoustic properties of the voice (e.g., pitch, timbre, and rate of speech). As a third example, a fingerprint scanner may capture and evaluate a fingerprint of the individual, and biometrics relating to the pattern of ridges and whorls of the fingerprint may be identified. These analyses may be initially performed to capture one or more biometrics identifying the individual, and may be stored, e.g., in a biometric database associating the biometrics with an individual identity of the individual. Later, when an unidentified individual is detected, various biometrics may be captured and compared with those in the biometric database to identify the individual. Such capturing and identification may involve multiple biometrics (either of the same modality, e.g., multiple biometric measurements of the face of the individual, or of different modalities, e.g., a facial feature, a fingerprint, and a voiceprint of the individual) in order to improve the accuracy of the identification.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Identifying individuals using biometrics may be difficult or inefficient in several respects. As a first example, the capturing and evaluation of the biometrics may comprise resource-intensive processes, thereby utilizing a high number of computing resources (e.g., power, processor, storage, memory, and/or network capacity). The resource utilization may incur a significant delay in performing the biometric analyses, and/or may be difficult to implement on computing devices having limited resources. As a second example, biometric evaluation may not be adequately robust, and may produce different results in different circumstances (e.g., different biometrics may be generated from the face of an individual if the visual lighting of the scene changes; if the angle of the captured image of the face changes; if the individual makes a different facial expression during capturing; or if the face of the individual changes, such as the use of different make-up, a different hair color or style, or an acquired physical deformity). These new circumstances may result in false negatives (e.g., failing to recognize a known individual) and/or false positives (e.g., incorrectly identifying an unknown individual as a known individual, or confusing a first known individual with a second known individual). Moreover, these inefficiencies may be exacerbated as the biometrics system scales to identify hundreds or thousands of individuals; e.g., if a particular biometric is stored as a hash value, the probability of a hash collision among two or more individuals may grow at an unacceptable rate.

Presented herein are techniques for supplementing the identification of biometrics with other information about an individual that may be more efficiently and/or accurately identified. It may be appreciated that in many contemporary scenarios, individuals often carry one or more devices that may be identifiable by the computer performing the biometric identification. For example, an individual may regularly carry a particular mobile phone, a pager, a mobile computer (such as a palmtop, laptop, or tablet computer), a gaming device, a camera, an audio or video player, or an implanted medical device (e.g., a pacemaker). The computer may be able to detect an identifier of the device, where the device identifier distinctively identifies the device (e.g., an identifier that identifies only one device) or differentiates the device from other devices that may be carried by other individuals (e.g., a particular model of a mobile phone). The computer may therefore associate one or more devices with an individual who carries the devices, and may, while registering the individual identity of an individual (e.g., while creating a user account in a user database), associate the device identifier of a detected device with the individual identity. Subsequently, when the computer seeks to identify an unidentified individual, the computer may, in addition to identifying one or more biometrics of the individual, detect one or more devices carried by the individual, and may detect one or more device identifiers of the respective devices (e.g., a device ID of a mobile phone, such as a mobile phone number, and/or a device ID of an implanted medical device, such as a pacemaker). The computer may then search the biometric database for individuals associated both with the detected biometrics and with the detected device identifiers. For example, the detected device identifiers may be utilized to reduce the number of individual identities that may match the biometrics of the individual. The capturing, storage, and retrieval of device identifiers may therefore supplement the identification of the individual according to various biometrics.

The inclusion of a device identifier to supplement the identification of an individual using biometrics may present some advantages over using only biometrics. As a first example, if the set of individuals who may be identified via biometrics is potentially large, the set of individuals potentially matching an unknown individual may be significantly reduced based on the device identifier (e.g., of a large set of known individuals, only a small number of such individuals may be known to carry a particular device type, so when an individual carrying the device type is presented, the number of individuals to be considered for biometric identification may be significantly reduced), thereby increasing the efficiency, speed, accuracy, and scalability of the identification. As a second example, the identification of a device may often be achieved with fewer computing resources than identifying a biometric, thereby providing an additional piece of evidence of the identity of the individual with a comparatively lower use of computing resources To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
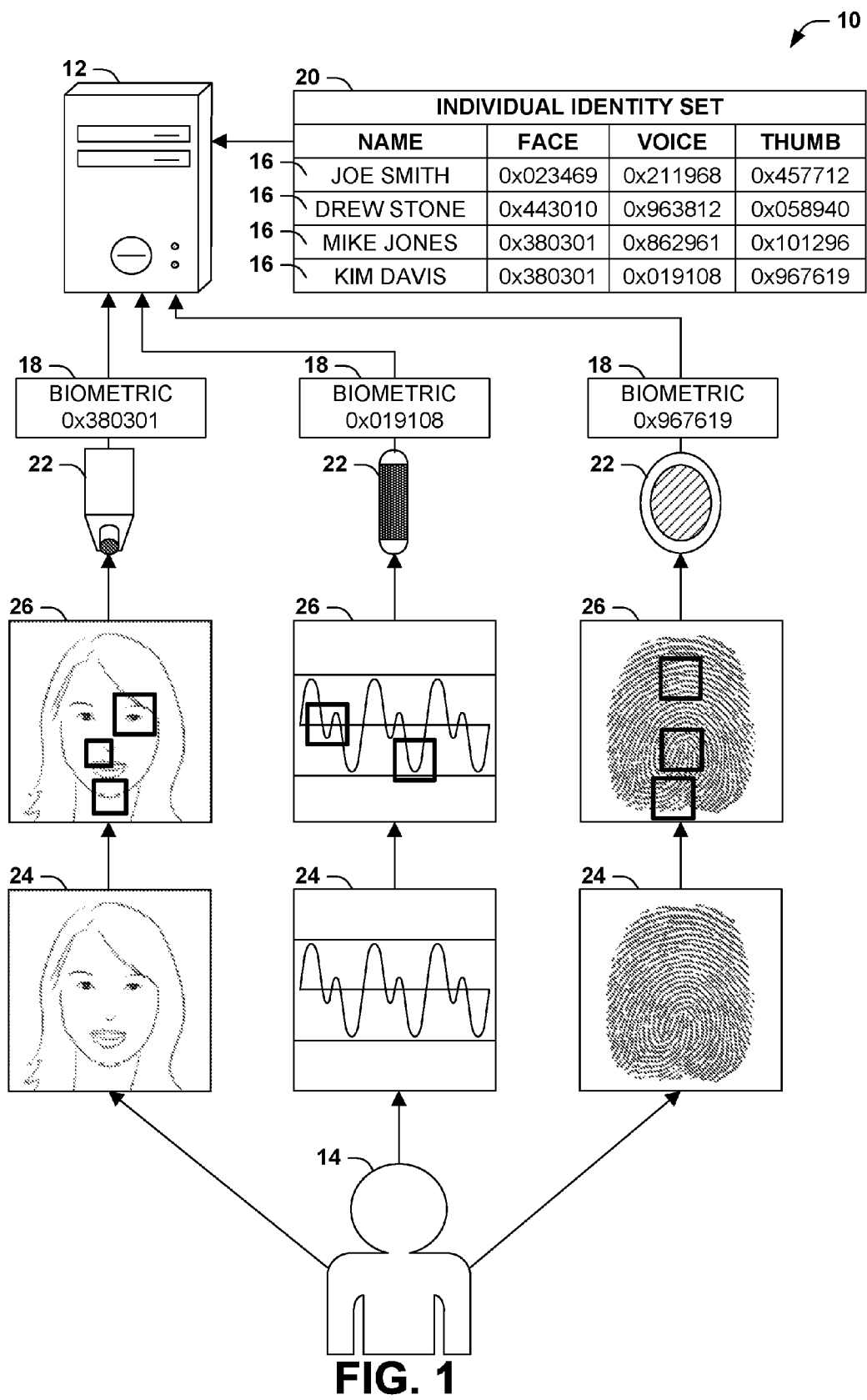
FIG. 1 is an illustration of an exemplary scenario featuring an identification of an individual using a set of biometrics.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve an identification of an individual using a set of one or more biometrics. For various individuals, a computer may register an individual identity by capturing measurements of various physical properties of the individual. When the computer is later presented with an individual, the computer may then perform the same types of measurements on the individual, and may identify the individual by identifying an individual identity having the same measurements.

As a first example, a camera may capture an image or video recording of an individual, and may evaluate various visible aspects of the individual (e.g., facial features, such as the distance between the eyes and the width of the nose; body shape, such as height and build; and gait, such as stride length, cadence, and arm swing). These measurements may form a set of biometrics that represent various visible aspects of the individual. As a second example, a microphone may capture and evaluate the voice of the individual. Various acoustic properties of the voice of the individual may be measured (e.g., pitch, timbre, and rate of speech), and may be utilized as biometrics based on the voice of the individual. As a third example, an optical or capacitative fingerprint scanner may detect various properties of a fingerprint of the individual, such as the depth of ridges, locations and sizes of whorls, and lengths of valleys. When initially presented with an individual, a computer may capture one or more biometrics identifying the individual, and may sore such biometrics, e.g., in a biometric database comprising one or more individual identities that respectively represent an individual based on a set of biometrics. Some such computers may capture multiple biometrics for an individual (either of the same modality, e.g., multiple biometric measurements of the face of the individual, or of different modalities, e.g., a facial feature, a fingerprint, and a voiceprint of the individual). When an unidentified individual is detected, the computer may then capture various biometrics of the individual and compare such biometrics with those in the biometric database, and may select an individual identity matching some or all of the biometrics.

FIG. 1 presents an illustration of an exemplary scenario 10 featuring a computer 12 configured to identify various individuals 14 according to one or more biometrics 18. In this exemplary scenario 10, the computer 12 comprises a set of biometric detectors 22, including a camera, a microphone, and a fingerprint scanner. These biometric detectors 22 (optionally including one or more software algorithms used in conjunction therewith) may be configured to capture a representation 24 of a physiological aspect of an individual 14, and to perform an analysis 26 on the representation 24 in order to generate one or more biometrics 18. When an individual 14 is first presented to the computer 12, the biometric detectors 22 may capture a representation 24 of the physiological aspect of the individual 14 (e.g., a still image of the face of the individual 14, an audio recording of a voice sample of the individual 14, and a fingerprint scan of a finger or thumb of the individual 14), and for each representation 24, may perform an analysis 26 to identify one more biometrics 18. For example, the camera may generate biometrics 18 associated with various visual measurements and dimensions of the face of the individual 14; the microphone may generate biometrics 18 associated with various acoustic measurements of the voice of the individual 14; and the fingerprint scanner may generate biometrics 18 associated with various patterns detected in the fingerprint of the individual 14. The computer 12 may also comprise an individual identity set 20, comprising a set of individual identities 16 for respective individuals 14 that store various biometrics 18 identifying the individual 14. For example, the various features of the representation 24 detected during the analysis 26 may be translated into a set of integers or a string, from which a hashcode may be computed using a hashing algorithm, and this hashcode (comprising a biometric 18) may be stored in the individual identity 16 of the individual 14. Subsequently, when an individual 14 is presented to the computer 12 (e.g., by stepping in front of the camera), the computer 12 may endeavor to identify the individual 14 by invoking the biometric detectors 22 to detect the same types of biometrics 18, and may compare the detected biometrics 18 of the individual 14 with those stored in various individual identities 16 of the individual identity set 20. If the individual 14 exhibits similar physiological features during the initial registration and the subsequent identification, the computer 12 may therefore be able to identify the individual 14 on the basis of biometrics 18 calculated from measurements of these physiological features. Additionally, this identification may be performed without the involvement of the individual 14; e.g., the individual 14 does not have to interact with the computer 12, such as by using a keyboard or other input device to enter identifying credentials. This less intrusive system may be more convenient for the individual 14, and/or may be performed without the knowledge or cooperation of the individual 14, and possibly even at a large distance (e.g., cameras positioned far away from the individual 14 but having significant zoom capabilities).

However, the exemplary scenario 10 of FIG. 1 may result in some inefficiencies and/or disadvantages. As a first example, the analysis 26 of representations 24 to identify biometrics 18 may be computationally intensive, and may consume a significant amount of power, processor, memory, storage, and/or network capacity. For example, identifying biometrics 18 from the face of an individual 14 may involve a high-resolution image captured with a camera, the application of sophisticated machine vision algorithms to identify the location of the face in the image and the features thereof, and the computation of biometrics 18 (such as hashcodes using various hash algorithms). Additionally, the computational resources involved in identifying a large number of individuals may rapidly increase, and may steadily reduce the perform ant nature of the biometric identification as a large number of individuals are registered. More computationally powerful computers 12 may be capable of performing this analysis 26 for one or several biometrics 18, but at a significant cost of resources, and possibly with a noticeable delay in identifying the individual 14; and less computationally powerful computers 12 may have to scale back to a more rudimentary identification of biometrics 18 (e.g., a lower-resolution image or less sophisticated machine vision algorithms) that may be less accurate, or may simply be incapable of performing the analysis 26.

As a second example, biometrics 18 may often be inaccurate. For example, the biometrics 18 identified for the face of an individual 14 may change if the face of the individual 14 is image in a different light or at a different angle, if the individual 14 makes a different facial expression (such as smiling), if the individual appears different due to the use of make-up or a change of hairstyle, or if the individual suffers a facial deformity. Similarly, the biometrics 18 identified from the gait of an individual 14 or from a fingerprint of the individual 14 may change if the individual 14 walks differently or intentionally or accidentally damages the skin of the finger. The use of multiple biometrics 18 may alleviate some of these changes (e.g., capturing three different biometrics 18 may allow a reliable identification of the individual 14 even if one biometric 18 changes), but further increases the computational costs of the biometric identification.

As a third example, individual identification via biometrics 18 may not scale well to match the identification of a large number of individuals 14. For example, the complexity and inaccuracy of the identification system may increase in proportion with the number of individuals 14 who are registered with the identification system. Identifying a particular individual 14 among a large set of known individuals 14 may therefore involve a greater number, variety, and precision of measurements are increasingly sensitive to smaller changes in the physiology of the individual 14. This expansion may increase the costs, complexity, delay, and/or inaccuracy of the identification system, thereby limiting its scalability when utilized to identify a potentially large number of individuals 14.

Due to these problems, it may be appreciated that systems that identify individuals 14 based solely on biometrics 18 may be inefficient or inadequate in some scenarios. However, some of these disadvantages may be alleviated by utilizing other information about an individual 14 that may supplement the biometric identification by providing additional information as to the identity of an individual. Additionally, it may be desirable to collect information that is comparatively easy to obtain (e.g., without involving computationally intensive analyses 26) and/or that may be collected without the involvement (and perhaps without the knowledge and/or cooperation) of the individual 14.

One such piece of information relates to devices that an individual 14 may carry. In many contemporary scenarios, individuals 14 often carry one or more devices, such as a mobile phone, a pager, a mobile computer (such as a palmtop, laptop, or tablet computer), a global positioning system (GPS) receiver, a gaming device, a camera, an audio or video player, or an implanted medical device (e.g., a pacemaker or cochlear implant). Such devices may even include devices lacking an independent power source, such as a radiofrequency identifier (RFID) chip embedded in an identification card such as a bank card or credit card, a solid-state data storage chip, or a Subscriber Identity Module (SIM) card inserted in a mobile phone. The individual 14 may have a known association with such a device, such as a regular habit of carrying the device. The computer 12 may be able to identify a device in the proximity of the individual 14 (either precisely (e.g., the device having a distinctive identifier); as a particular device type (e.g., a particular model, such as a model or brand of a mobile phone); or as a device class (e.g., simply a mobile phone of an unidentified model type).) This information alone may be inadequate for identifying the individual 14. For example, a device detector 40 may only be able to identify the location of a device 34 (and, presumably, the individual 14 carrying it) within a general area, e.g., a one-hundred-meter radius around a WiFi receiver, while a biometric detector 22 may identify the location of the individual 14 with much greater precision. However, the detection of the device 34 may be useful for supplementing the biometric identification of the individual 14. For example, this information may be used to reduce the number of individual identities 16 of the individual identity set 20 to those that are associated with the detected device, and the computer 12 may be able to perform less searching, and/or to collect a fewer number of biometrics 18 in order to complete the identification of the individual 14, thereby resulting in a faster and/or more efficient identification of the individual 14.

The identification of a device associated with an individual may also have other advantages. For example, the identification of a device associated with the individual may be used to improve the accuracy of the identification of the individual 14, such as by resolving conflicts among the collected biometrics 18 (e.g., where an individual 14 matches only two out of three biometrics 18 comprising an individual identity 16, the identification of a device associated with the individual identity 16 and detected in the proximity of the individual 14 may resolve the uncertainty), and/or to resolve conflicts among individual identities 16 (e.g., in the case of a hash collision where a biometric 18 identified for an individual 14 is associated with two individual identities 16, the detection of the device that is associated with only one of the two individual identities 16 may facilitate a resolution of the hash collision). The use of the device identification may therefore improve the efficiency, speed, accuracy, and/or scalability of the biometric identification system utilized by the computer 12.

Figure 2:
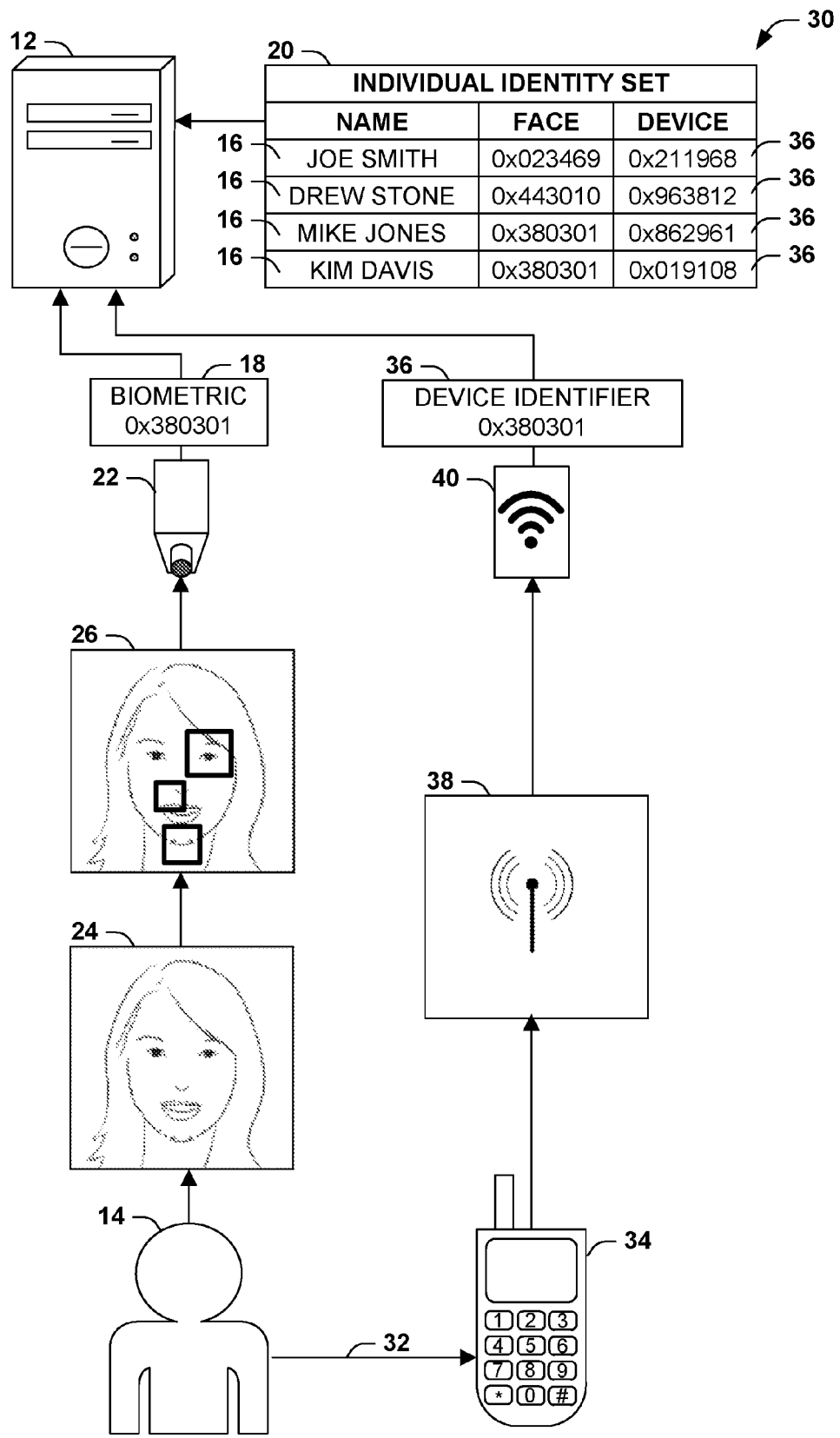
FIG. 2 is an illustration of an exemplary scenario featuring an identification of an individual using a biometric and a device identification of a device associated with the individual according to the techniques presented herein.

FIG. 2 presents an illustration of an exemplary scenario 30 featuring an identification of a device to supplement the biometric identification of an individual 14. In this exemplary scenario 30, a computer 12 comprising a biometric detector 22 (e.g., a camera) is configured to identify an individual 14 by capturing a representation 24 of a physiological aspect of the individual 14 (e.g., the face of the individual 14) and performing an analysis 26 to identify one or more biometrics 18 that may later be used to identify the individual 14. However, in accordance with the techniques presented herein, the computer 14 also includes a device detector 40, such as a wired or wireless communication component, that is configured to detect a device 34 associated with the individual 14 (e.g., by communicating with a wireless transmitter component 38 of the device 34). When the individual 14 is initially presented to the computer 12, the computer 12 may register the individual 14 by identifying one or more biometrics 18, but may also invoke the device detector 40 to detect one or more devices 34 having an association 32 with the individual 14. In particular, the device detector 40 may identify one or more device identifiers 36, such as a distinctive identifier or an identification of the device type or device class of the device 34. The computer 12 may then store in an individual identity set 20 an individual identity 16 for the individual 14, comprising both the at least one biometric 18 and the at least one device identifier 36. Subsequently, when an unidentified individual 14 is presented to the computer 12, the computer may invoke the biometric detector 22 to identify one or more biometrics 18 of the individual 14, and may concurrently or consecutively invoke the device detector 40 to identify one or more device identifiers 36 of at least one device 34 in the proximity of the individual 14. The computer 12 may then examine the individual identities 16 of the individual identity set 20 to identify an individual identity 16 comprising the biometric 18 and also the device identifier 36. In this manner, the computer 12 may utilize the device identifier 16 to supplement the identification of the individual 14 based on the detected set of biometrics 18.

Figure 3:
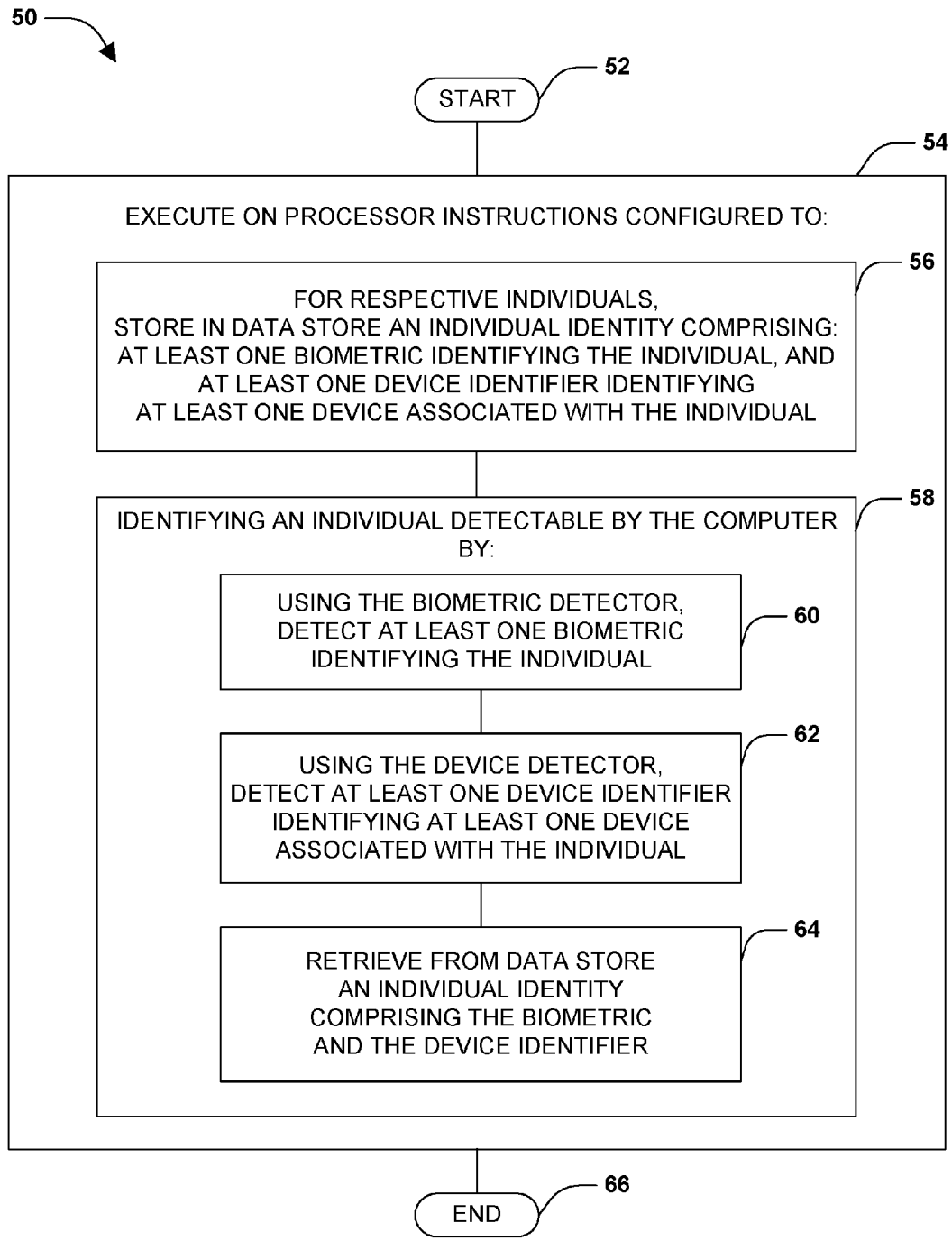
FIG. 3 is a flow chart illustrating an exemplary method of identifying individuals.

FIG. 3 presents a first embodiment of these techniques, illustrated as an exemplary method 50 of identifying individuals 14 using a computer 12 having a processor, a data store, a biometric detector 22, and a device detector 40. The exemplary method 50 may be implemented, e.g., as a set of software instructions stored in a memory component (e.g., a system memory circuit, a platter of a hard disk drive, a solid state storage device, or a magnetic or optical disc) of the computer 12, that, when executed by the processor of the computer 12, cause the processor to perform the techniques presented herein. The exemplary method 50 begins at 52 and involves executing 54 the instructions on the processor. More specifically, the instructions are configured to, for respective individuals 14, store 56 in the data store an individual identity 16 comprising at least one biometric 18 identifying the individual 14, and at least one device identifier 36 identifying at least one device 34 associated with the individual 18. The instructions are also configured to identify an individual 14 who is detectable by the computer 12 by, using the biometric detector 22, detecting 60 at least one biometric 18 identifying the individual 14; using the device detector 62, detecting 62 at least one device identifier 36 identifying at least one device 34 that is associated with the individual 14; and retrieving 64 from the data store an individual identity 16 comprising the biometric 18 and the device identifier 36. In this manner, the instructions cause the computer 12 to identify individuals 14 according to the techniques presented herein, and so the exemplary method 50 ends at 66.

Figure 4:
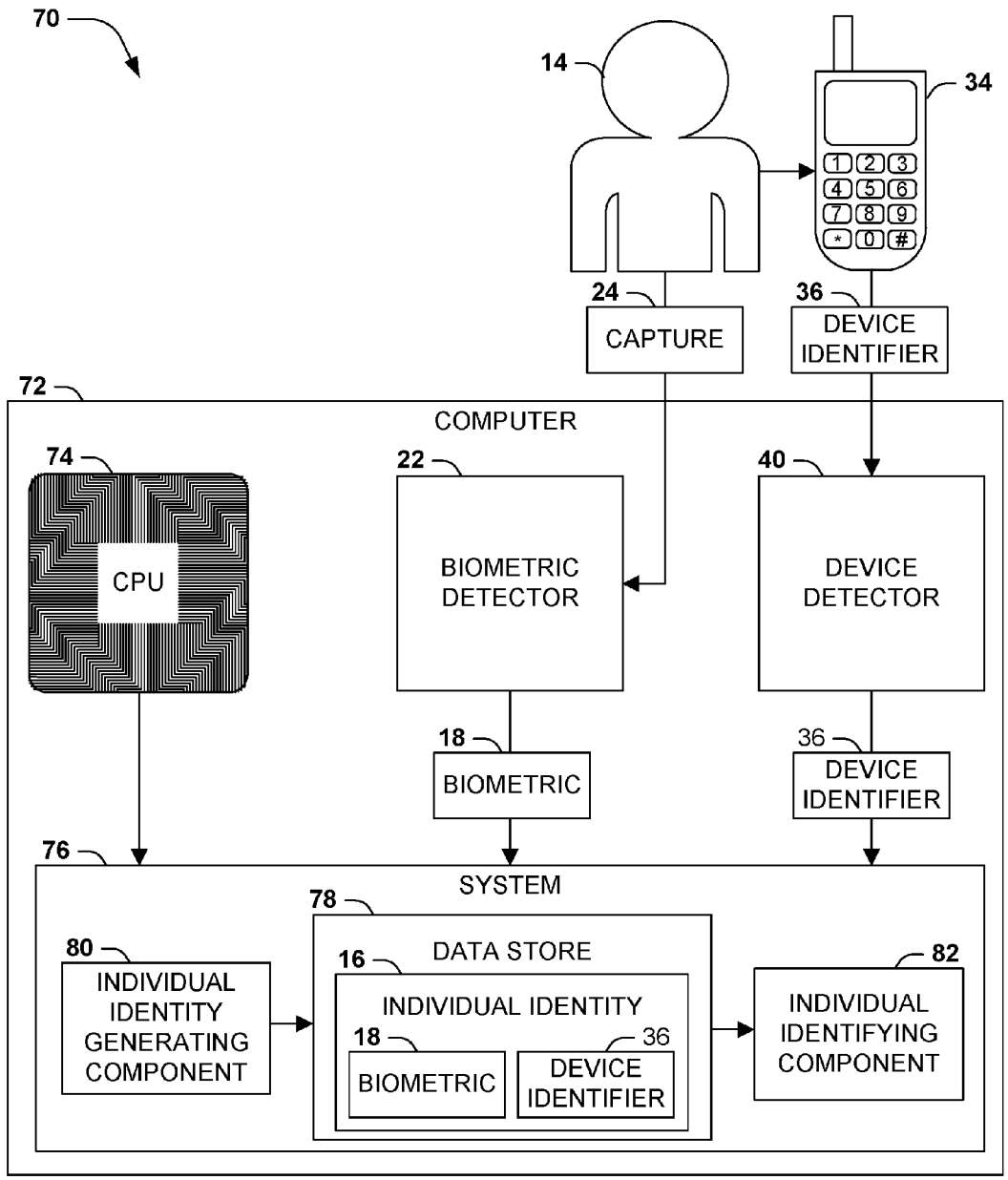
FIG. 4 is a component block diagram illustrating an exemplary system for identifying individuals.

FIG. 4 presents a second embodiment of these techniques, illustrated as an exemplary system 76 configured to identify individuals 14 using a computer 72 having a processor 74, a biometric detector 22, and a device detector 40. The exemplary system 76 may be implemented, e.g., as a software architecture, comprising a set of components, each comprising a set of software instructions stored in a memory component (e.g., a system memory circuit, a platter of a hard disk drive, a solid state storage device, or a magnetic or optical disc) of the computer 72, that, when executed (concurrently or consecutively) by the processor of the computer 72, cause the processor 74 to perform one or more tasks of the techniques presented herein. The exemplary system 76 includes a data store 78 that is configured to store individual identities 16 of respective individuals 14, where each individual identity 16 comprises at least one biometric 16 identifying the individual 14 (e.g., according to an identified physiological aspect of the individual 14), and at least one device identifier 36 identifying at least one device 34 associated with the individual 14. The exemplary system 76 also includes an individual identity generating component 80, which is configured to store in the data store 78 individual identities 16 of respective individuals 14 by, using the biometric detector 22, detecting at least one biometric 18 identifying the individual 14; using the device detector 40, detecting at least one device identifier 36 identifying at least one device 34 associated with the individual 14; and storing in the data store 78 an individual identity 16 comprising the biometric 18 and the device identifier 36. The exemplary system 76 also includes an individual identifying component 82, which is configured to identify an individual 14 by, using the biometric detector 80, detecting at least one biometric 18 identifying the individual 14; using the device detector 40, detecting at least one device identifier 36 identifying at least one device 34 that is associated with the individual 14; and retrieving from the data store 78 an individual identity 16 comprising the biometric 18 and the device identifier 36. In this manner, the components of the exemplary system 76 in the exemplary scenario 70 of FIG. 4 cause the processor 74 to identify individuals 14 according to the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
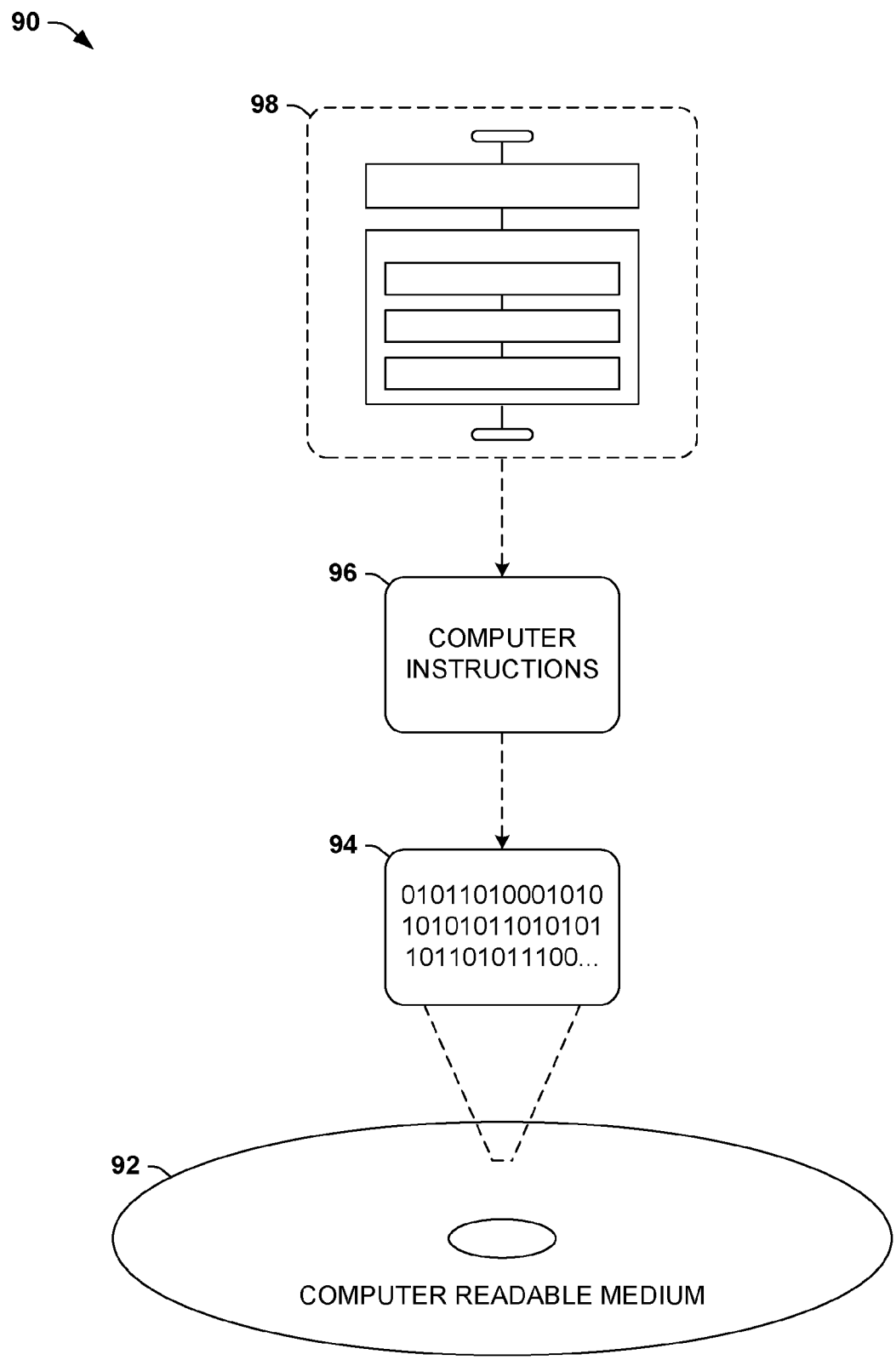
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of identifying individuals, such as the exemplary method 50 of FIG. 3. In another such embodiment, the processor-executable instructions 96 may be configured to implement a system for identifying individuals, such as the exemplary system 76 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 76 of FIG. 4) to confer individual and/or synergistic advantages upon such embodiments.

A first aspect that may vary among embodiments of these techniques relates to the scenarios wherein such techniques may be utilized. As a first variation of this first aspect, these techniques may be utilized to track many types of biometrics 18 using many types of biometric detectors 22, such as cameras, microphones, tactile sensors, and chemical analyzers, as well as many types of algorithms, such as machine vision algorithms, acoustic analysis algorithms, and machine learning algorithms that are developed and/or trained to perform tasks such as pattern recognition. For example, the biometric detector 22 may comprise a camera configured with a face detection component (e.g., an algorithm configured to analyze an image, identify an area of the image depicting a face of an individual, and extract biometrics 18 from the detected face), and the biometrics 18 identifying the individual 14 may comprise face biometric measurements.

As a second variation of this first aspect, these techniques may be utilized to track many types of devices 34 using many types of device detectors 40. As a first example the device detector 40 may comprise many types of wireless or wireless communication adapters (e.g., cellular network adapters, local area network adapters, and wide area network adapters), or even a camera configured to visually identify the device 34 (and possibly the same camera used to detect the biometric 18 of the individual 14). While this latter embodiment may be less efficient than others (e.g., by involving an analysis 26 of a representation 24 of the device 34, such as an image), it may have particular advantages, e.g., by facilitating the detection of a device 34 that is not capable of or configured to communicate with the device detector 40). As a second example, these types of device detectors 40 may also be capable of detecting many types of devices 34, including mobile phones, pagers, mobile computer (such as a palmtop, laptop, or tablet computer), global positioning system (GPS) receivers, gaming devices, cameras, audio or video players, implanted medical devices (e.g., a pacemaker or cochlear implant), and even devices lacking an independent power source, such as radiofrequency identifier (RFID) chips embedded in an identification card such as a bank card or credit card, solid-state data storage chips, and Subscriber Identity Module (SIM) cards inserted in a mobile phone. As a third example, many types of device identifiers 36 may be identified with respect to such devices 34, including a distinctive identifier (e.g., a Globally Unique Identifier (GUID)) that definitively differentiates the device 34 from every other device 34; a device type of the device 34, such as an instance of a particular model of devices 34 (e.g., a brand or model of a mobile phone); and a device class of the device 34, such as the general properties and/or capabilities of the device 34 (e.g., an identification of a device 34 as a mobile phone).

As a third variation of this first aspect, many types of associations 32 may be utilized to associate a device 34 with an individual 14. As a first example, the association 32 may be identified based on the proximity of the device 34 to the individual 14 (e.g., detecting the device 34 on the person of or in a close proximity with the individual 14. As a second example, the association 32 may be identified based on an explicit association; e.g., in addition to its device identifier 36, the device 34 may identify the individual 14 who is authorized to use the device 34. As a third example, the association 32 may be identified based on correlation; e.g., even if the device 34 is not proximate to the individual 14, the correlated presence and absence of the device 34 and the individual 14 at similar times may indicate the association 32. For example, the device 34 may comprise a vehicle driven by the individual 14, and even if the computer 12 may be unable to identify the occupants of the vehicle (e.g., the device detector 40 may comprise a license plate reader that monitors entry and exit of automobiles from a parking lot), the computer 12 may be able to correlate the presence of a device 34 with the presence of one or more individuals 14 (e.g., individuals 14 who are often detected at the same times that the vehicle is present in the parking lot), and therefore identify an association 32 of the device 34 with the individual 14. As a fourth example, the association 32 may also be sporadic (e.g., an individual 14 may occasionally carry the device 34) and/or consistent (e.g., an implanted medical device), and the computer 12 may accordingly adjust the evidentiary weight of the detected presence or absence of the device 34 while identifying the individual 14. As a fifth example, an individual 14 may also have associations with two or more devices 34, either in the alternative (e.g., an individual 14 may drive one of two vehicles) or cumulative (e.g., the individual 14 often carries two or more devices 34, either independently or together). As a sixth example, a device 34 may be shared by two or more individuals 14, and may therefore be associated with both individual identities 16.

As a fourth variation of this first aspect, these techniques may identify an individual 14 with the cooperation of the individual (e.g., a user who wishes to login to the computer 12) or without the cooperation of the individual (e.g., a hostile prisoner). These techniques may also be utilized overtly (e.g., by notifying the individual 14 of the automated identification, and possibly including the cooperation of the individual 14) or covertly (e.g., by clandestinely positioning the biometric detector 22 and/or the device detector 30 in a concealed location or at a long range from the individual 14). Those of ordinary skill in the art may devise many scenarios wherein the techniques presented herein may be utilized.

A second aspect that may vary among embodiments of these techniques relates to the registration of the individual identity 16 of an individual 14 comprising at least one biometric 18 and at least one device identifier 36. As a first variation of this second aspect, the computer 14 may receive biometrics 18 and/or device identifiers 36 from another source, and may subsequently utilize this data as individual identities 16 to identify individuals 14. Alternatively, the computer 14 may also be configured to generate individual identities 16, e.g., upon receiving an individual identity registration request to register the individual identity 16 of the individual 14 (from the individual 14 and/or another user of the computer 12). As a first such example, the computer 14 may passively wait until such a registration request is received, and may then activate the biometric detector 22 and/or the device detector 40 to detect the biometrics 18 and/or device identifiers 36 of the device 34. As a second such example, the computer 12 may spontaneously initiate the registration of an individual identity 16 of an individual 14, e.g., by sporadically or continuously detecting biometrics 18 and/or device identifiers 36, and initiating the registration upon identifying a biometric 18 and/or device identifier 36 that is not associated with an individual identity 16 in the data store 78 (e.g., by searching the data store 78 upon detecting the biometric 18 or device identifier 36, and upon not finding a corresponding individual identity 16, storing a new individual identity 16 in the data store 78). This registration process may be initiated automatically, and/or may be contingent upon the consent of the individual 14 or another user (e.g., the computer 12 may present to the individual 14 an offer to generate an individual identity 16 for the individual 14 and/or to associate an identified device 34 with the individual identity 16 of the individual 14, and only proceeding upon receiving from the individual 14 an acceptance of the offer). As a third such example, the computer 12 may separately scan for unrecognized devices 34, and may seek to associate newly detected devices 34 with one or more individuals 14; e.g., upon detecting a device identifier 36 and failing to find an individual identity 16 in the data store 78 associated with the device identifier 36, the computer 12 may ask one or more individuals 14 having an individual identity 16 (e.g., the individuals 14 who are currently present) to claim the device 34, and may associate the device identifier 36 of the device 34 with the individual identity 16 of any individual 14 who sends a claim to the device 34 to the computer 12.

Figure 6:
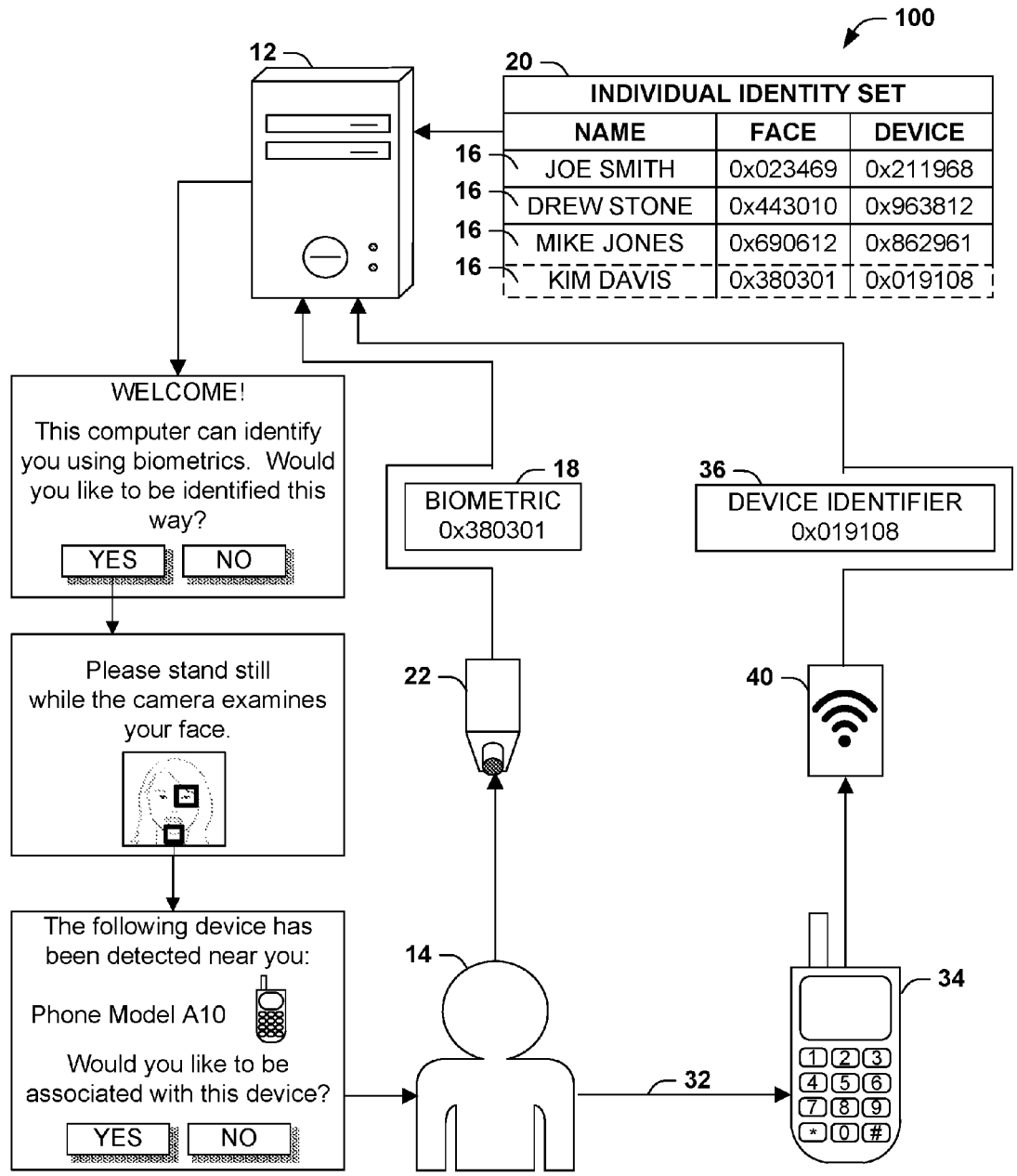
FIG. 6 is an illustration of an exemplary scenario featuring a registration of an individual identity of an individual.

FIG. 6 presents an illustration of an exemplary scenario 100 featuring several such variations of this second aspect during the registration of an individual identity 16 of an individual 14. In this exemplary scenario 100, a computer 12 having a biometric detector 22, a device detector 40, and a data store 78 storing an individual identity set 20 may detect a presence of an individual 14. First, the computer 12 may present to the individual 14 an offer to register the individual identity 16 of the individual 14 using one or more biometrics 16, and may only proceed with biometric registration upon receiving from the individual 14 an acceptance of the offer. The computer 12 may then activate the biometric detector 22, perform an analysis 26 of a captured representation 24 of the individual 14, extract one or more biometrics 18, and create a new individual identity 16 for the individual 14 comprising the biometric(s) 18. Additionally, the computer 12 may activate the device detector 40, and may receive from a device 34 associated with the individual 14 one or more device indicators 36. The computer 12 may then present to the individual 14 an offer to associate the device 34 (and, in particular, the device identifiers 36 of the device 34) with the individual identity 16 of the individual 14. The individual 14 may or may not wish to be associated with the device 34 (e.g., the individual 14 may be in only temporary possession of a device 34 of another individual 14). Upon receiving from the individual 14 an acceptance of the offer to associate the device 34 with the individual 14, the computer 12 may store the device identifier 36 in the data store 78 associated with the individual identity 16 of the individual 14. In this manner, the computer 12 may register the individual identity 16 of the individual 14 including both one or more biometrics 18 and one or more device identifiers 36, based on the interaction, consent, and cooperation of the individual 14. Those of ordinary skill in the art may devise many variations in the registration of the individual identity 16 of the individual 14 in accordance with the techniques presented herein.

A third aspect that may vary among embodiments of these techniques relates to the identification of individuals 14 based on the biometrics 18 and device identifiers 36 associated with various individual identities 16 representing various individuals 14. As a first variation of this second aspect, the identification may begin upon request of the individual 14 or another user of the computer 12 (e.g., the computer 12 may deactivate the biometric detector 22 and/or device detector 40 until receiving a request to identify an individual 14). Alternatively, the computer 12 may utilize the biometric detector 22 and/or the device detector 40 to detect a presence of an individual 14 (e.g., a light sensor configured to detect when an individual 14 steps in front of a camera), and may spontaneously initiate the identification of the individual 14. A combination of these techniques may also be utilized; e.g., upon detecting a presence of an individual 14, the computer 12 may present to the individual 14 an offer to initiate an identification process involving various biometrics 18. The computer 12 may also be configured to, upon identifying an individual 14, notify the individual 14 that the identification has been achieved.

As a second variation of this third aspect, the detected biometrics 18 and/or device identifiers 36 may be utilized in any order and/or combination. As a first such example, the computer 12 may concurrently detect one or more biometrics 18 and one or more device identifiers 36, which may be generated in a different order based on various circumstances (e.g., based upon varying complexity of the analyses 26 of respective representations 24), and, upon receiving each such identifier, may incrementally whittle down the set of individuals 14 having individual identities 16 in the individual identity set 20 that correspond to the detected identifiers. This example may be advantageous, e.g., by concurrently invoking all of the identification capabilities of the computer 12 in order to achieve a rapid identification of the individual 14. As a second such example, the computer 12 may utilize the detection of biometrics 18 and/or device identifiers 36 in a particular order. For example, the computer 12 may invoke a sequence of identification by first detecting more accurate, more efficient, and/or more diagnostic identifiers, and may differentially select other identifiers to narrow down the subset of individual identities 16. As another such example, the computer 12 may first detect a device identifier 36 of the individual 14. Upon identifying only one individual identity 16 associated with the device identifier 36, the computer 12 may identify one or more biometrics 18 of the individual 14 to verify this individual identity 16 (e.g., to verify that another individual 14 is not simply carrying the device 34 of another individual 14). Alternatively, upon identifying two or more individuals 14 who are associated with the device 34 (e.g., two or more individual identities 16 comprising the device identifier 36 of the device 34), the computer 12 may use biometrics 16 to differentiating the individuals 14 in order to identify the individual 14. For example, if two individuals 14 are associated with a particular device 34 that is detected in association with an unidentified individual 14, the computer 12 may endeavor to select a biometric 16 that efficiently and accurately differentiates these two individuals 14. The computer 12 may then invoke the corresponding biometric detector 22 to detect the biometric 16 of the unidentified individual 14, and may therefore identify the unidentified individual 14 according to one (or neither) of the individual identities 16. These examples may involve a longer duration (due to invoking identification techniques sequentially), but may reduce the invocation of some identifying components that may be unnecessary to identify the individual 14, thereby conserving computing resources and/or the privacy of the individual 14 (e.g., by not utilizing a potentially sensitive biometric identification that may not be necessary).

As a third variation of this third aspect, a device detector 40 may have a variable device detector range (e.g., a Wi-Fi receiver may apply more or less power to an antenna in order to increase or decrease the range of device detection, and/or may be configured only to detect devices 34 within a certain proximity to the computer 12). The computer 14 may therefore, upon receiving from an individual 14 a device detector range, accordingly set the device detector range of the device detector.

As a fourth variation of this third aspect, the computer 12 may include an individual whitelist, which may identify one or more individual identities 16 that are to be searched before other individual identities 16. For example, the computer 12 may be more often patronized (or the area of the detection may be more heavily frequented) by a particular subset of individuals 14 among the set of individuals 14 for which the computer 12 has individual identities 16. The computer 12 may therefore present an improved user experience by, upon detecting one or more biometrics 18 of an unidentified individual 14, first searching the individual identities 16 referenced by the individual whitelist, in order to recognize such individuals 14 faster; and may only search the other individual identities 16 if the detected biometrics 18 and/or device identifiers 36 are not associated with any individual identity 16 included in the individual whitelist.

As a fifth variation of this third aspect, the computer 12 may include a device blacklist, which may identify one or more blacklisted devices that are not to be identified and/or utilized in the identification of any individual 14. For example, a device 16 may publicly or communally utilized (e.g., a portable device that is available to many or any individual 14 in a public space), and while the identification of other devices 16 may promote the identification of associated individuals 14, the presence of this particular device 16 may only reduce the accuracy of the identification of individuals 14. Accordingly, when the computer 12 detects one or more device identifiers 36, the computer 12 may search the device blacklist, and may only include in the identification process device identifiers 36 that are not identified in the device blacklist. Those of ordinary skill in the art may devise many variations in the identification of individuals 14 using biometrics 18 and device identifiers 36 in accordance with the techniques presented herein.

A fourth aspect that may vary among embodiments of these techniques relates to tracking the presence of an individual 14 who has been identified using biometrics 18 and device identifiers 36. An individual 14 may be identified as present in a particular area (e.g., a proximity to the computer 12, one or more biometric detectors 22, and/or one or more device detectors 40). However, as the individual 14 moves about within the area, the identification of the individual 14 using these components may fluctuate. Nevertheless, it may be possible to track the persistent presence of the individual 14 within the area using the continued detection of biometrics 18 and/or device identifiers 36.

Figure 7:
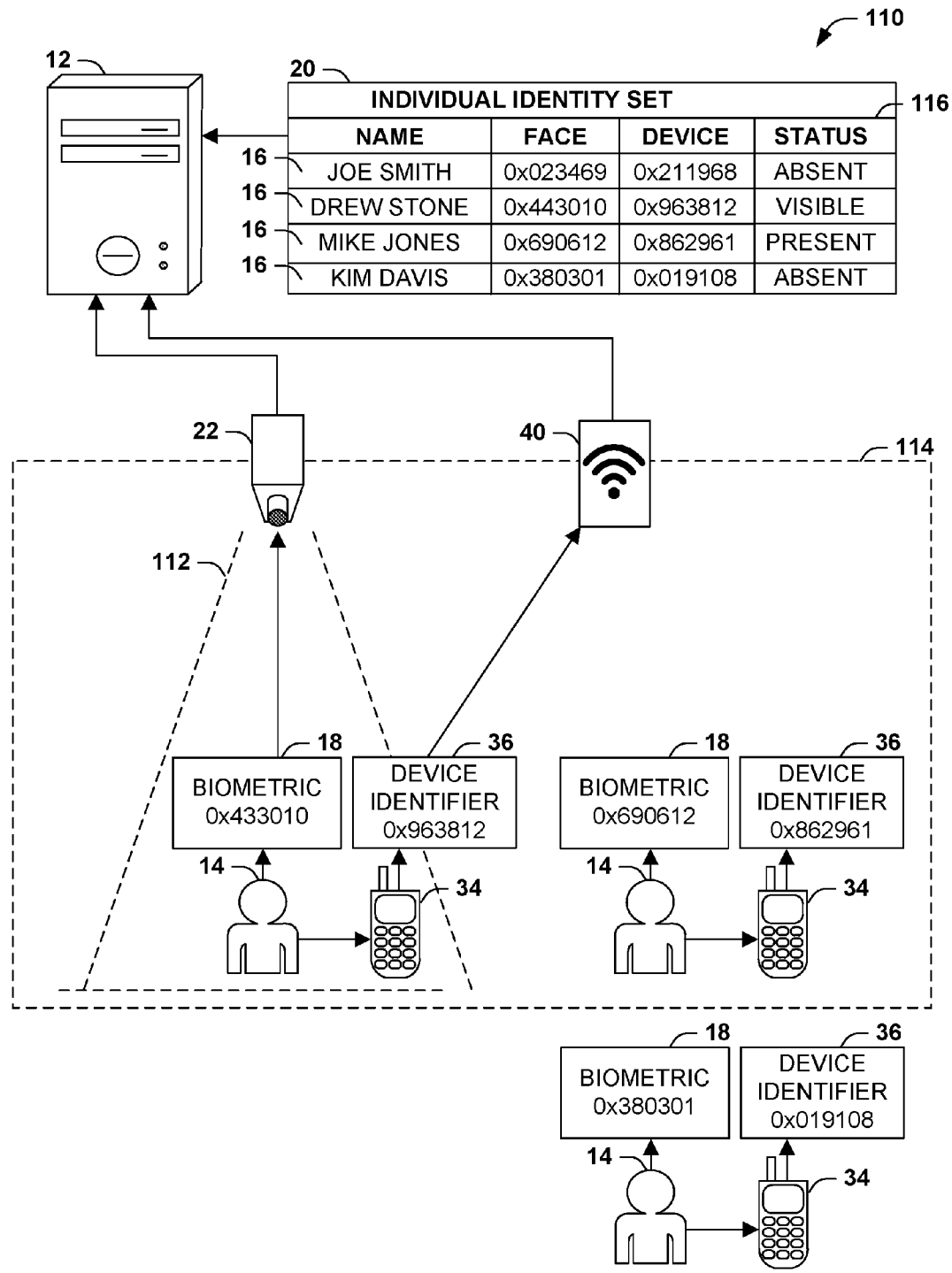
FIG. 7 is an illustration of an exemplary scenario featuring a persistent presence tracking of a group of individuals.

FIG. 7 presents an illustration of an exemplary scenario 110 featuring a persistent tracking of the presence of various individuals 14 in an area. In this exemplary scenario 110, a computer 12 features an individual identity set 20 comprising a set of individual identities 16 identifying respective individuals 14 according to a biometric 18 and a device identifier 36. The computer 12 is also equipped with a camera (operating as a biometric detector 22) and a wireless communication receiver, such as a Wi-Fi network adapter (operating as a device detector 40). Moreover, these detectors have different ranges of detection; e.g., the biometric detector 22 may have a biometric detector range 112 within which biometrics 18 may be detected (e.g., the line of sight and degree of panorama of the camera), while the device detector 40 may detect devices 34 within a broad device detector range 114 (e.g., an entire radius of the device detector 40, regardless of line of sight).

Within the area of the exemplary scenario 110 of FIG. 7, the computer 12 may endeavor to detect and identify various individuals 14. For example, when a presence of a first individual 14 within the biometric detector range 112 is detected by the camera, biometrics 18 and device identifiers 36 may be collected, and the first individual 14 may be identified as the individual having the name "Drew Stone." Additionally, a "visible" presence indicator 116 may be recorded in the individual identity 16 of this individual 14 to indicate that the individual 14 is currently present and visible to the computer 12 within the area. However, the individual 14 may eventually move to a different location within the area, and the computer 12 may no longer detect the biometrics 18 of the individual within the biometric detector range 112. However, the persistent presence of the individual 14 may continue to be tracked due to the continued detection of the device identifier 24. For example, a second individual 14 may initially appeared within the biometric detector range 112, and may have been identified as the individual named "Mike Jones," but the individual 14 may have since moved to a different area. Nevertheless, the device identifier 36 of a device 34 carried by the second individual 14 may continue to be detected within the device detector range 114 of the device detector 40. Accordingly, in the individual identity set 20, the "visible" presence indicator 116 stored in the individual identity 16 of this individual 14 may be replaced with a "present" presence indicator 116 to indicate that, although the individual 14 is no longer visible to the camera of the computer 12, the presence of the individual 14 in the area is still detected. Finally, when an individual 14 who has been previously identified (such as a third individual 14 having the name "Kim Davis") departs both the biometric detector range 112 and the device detector range 114, the computer 12 may replace the "present" presence indicator 116 in the individual identity 16 of this individual with an "absent" presence indicator 116 to indicate the departure of the individual 14 from the area. In this manner, the various detectors of the computer 12 may interoperate to track the persistence presence of individuals 14 in an area despite the fluctuating visibility of such individuals 14 to the biometric detector(s) 22 and/or the device detector(s) 40. Those of ordinary skill in the art may devise many ways of tracking the presence of identified individuals 14 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
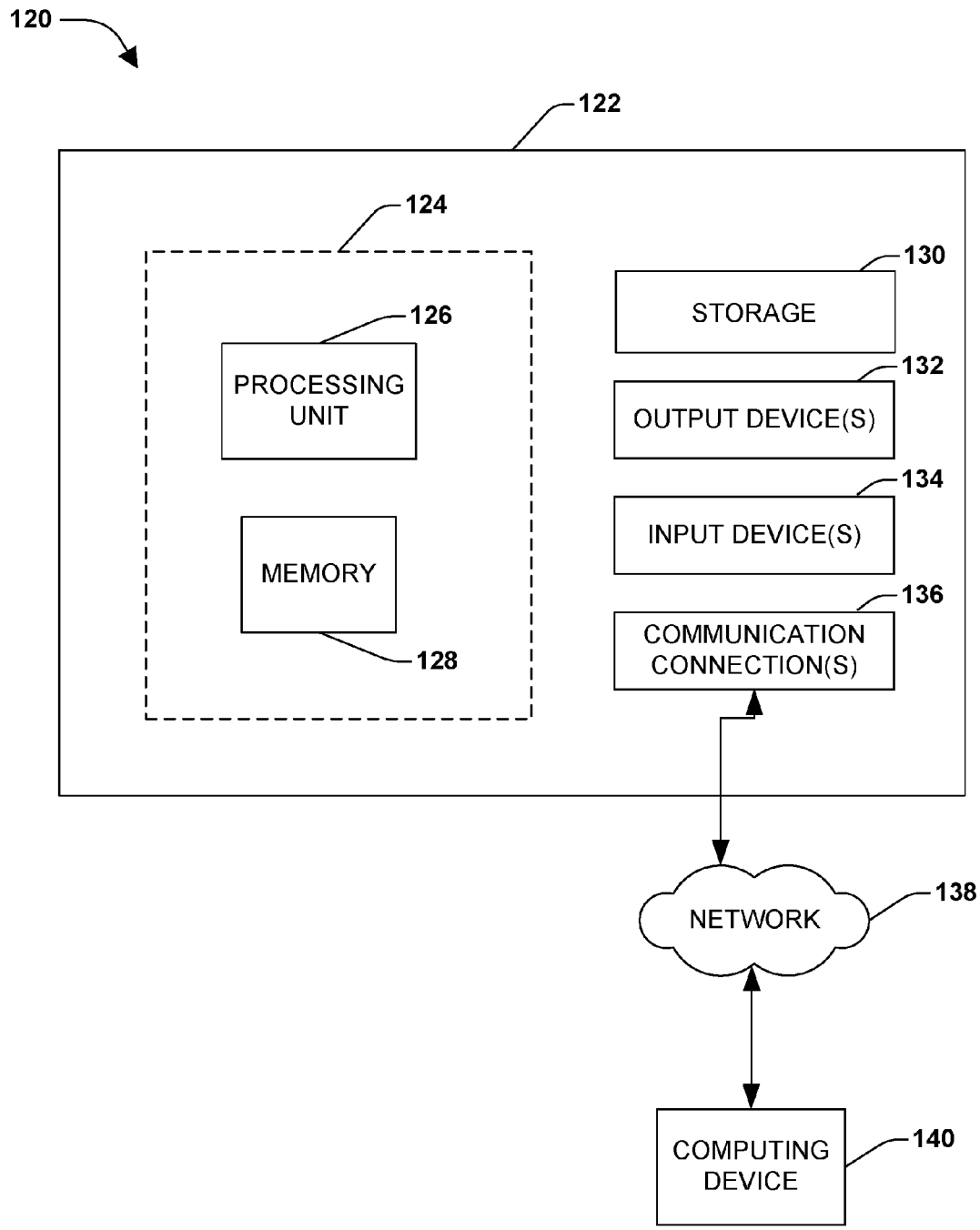
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 8 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 8 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of identifying individuals using a computer having a processor, a data store, a biometric detector, and a camera, the method comprising:
    executing on the processor instructions that cause the computer to:
        for respective individuals, store in the data store an individual profile of an individual identity, the individual profile comprising, as individual identifiers that establish the identity of the individual:
            an established biometric measurement exhibited by the individual; and
            a representation of a visual feature of a device that is associated with the individual; and
        during a presence of an individual in possession of an individual device, identify the individual by:
            using the biometric detector, detecting a detected biometric measurement exhibited by the individual;
            matching the detected biometric measurement with the established biometric measurement in the individual profile;
            using the camera, capturing an image of the individual device;
            matching the image with the representation of the visual feature of the device associated with the individual in the individual profile; and
            determining that matching the detected biometric measurement with the established biometric measurement, and matching the image of the individual device with the visual feature of the device, together establish the individual identity of the individual; and
        responsive to establishing the individual identity of the individual, interact with the individual according to the individual identity.

2. The method of claim 1, wherein:
    the biometric detector further comprises a face detector; and
    at least one biometric measurement exhibited by the individual further comprising a face biometric measurement.

3. The method of claim 1, wherein:
    at least one device is associated with at least two individuals; and
    executing the instructions further causes the device to, while detecting an individual and upon identifying two individual identities associated with a device identifier of the device:
        identify at least one selected established biometric measurement that differentiates the individual identities; and
        matching the detected biometric measurement with the selected established biometric measurement that is associated with one of the two individual identities and that distinguishes another of the two individual identities.

4. The method of claim 1, wherein storing the individual identity in the data store further comprises: storing the individual identity in the data store responsive to receiving an individual identity registration request to register the individual identity.

5. The method of claim 4, wherein storing the individual identity in the data store further comprises:
responsive to the biometric detecting the detected biometric measurement, search the data store for an individual profile comprising the biometric; and
upon not finding in the data store an individual profile comprising the detected biometric measurement, creating a new individual profile in the data store for the individual.

6. The method of claim 5, wherein storing the individual identity further comprises:
using the camera, capturing an image of the individual; and
responsive to identifying at least one visual feature of a device in possession of the individual, storing the device feature in the individual profile of the individual identity of the individual.

7. The method of claim 6, wherein storing the visual feature of the device in the data store further comprises:
presenting to an individual an offer to associate the device with the individual identity of the individual; and
responsive to an acceptance of the offer by the individual, storing the visual feature of the device in the individual profile of the individual identity of the individual.

8. The method of claim 1, wherein executing the instructions further causes the device to:
responsive to detecting a visual feature of a device in an image captured by the camera, search the data store for an individual identity comprising the device identifier; and
responsive to not finding in the data store an individual profile of an individual identity that is associated with the visual feature of the device:
ask at least one individual having an individual identity to claim the device; and
responsive to a claim of the device by a responding individual having established an individual identity of an individual profile in the data store, storing, in the individual profile of the responding individual, a representation of the visual feature of the device.

9. The method of claim 1, wherein detecting the detected biometric measurement further comprises: using the biometric detector, detecting the detected biometric measurement of the individual responsive to detecting a presence of the individual.

10. The method of claim 9, wherein detecting the detected biometric measurement further comprises:
responsive to detecting the presence of the individual, presenting to the individual an offer to identify the individual; and
responsive to an acceptance by the individual of the offer to identify the individual, detecting the detected biometric measurement of the individual.

11. The method of claim 1, wherein
the computer further comprises a device blacklist identifying a representation of a visual feature of a blacklisted device that is not to be used to establish the individual identity of any individual; and
matching the image with the representation of the visual feature of the device associated with the individual in the individual profile further comprises: verifying that the image does not match the representation of the visual feature of any blacklisted device on the device blacklist.

12. The method of claim 1, wherein:
the computer further comprises an individual whitelist identifying at least one individual profile of an individual for which the individual identity can be established; and
establishing the individual identity of the individual further comprises:
determining that matching the detected biometric measurement with the established biometric measurement associated with an individual profile that is included in the individual whitelist, and matching the image of the individual device with the visual feature of the device, together establish the individual identity of the individual.

13. The method of claim 1, wherein executing the instructions further causes the device to, responsive to establishing the individual identity of the individual, notifying the individual associated with the individual identity of the identification of the individual.

14. The method of claim 1, wherein executing the instructions further causes the device to, responsive to establishing the individual identity of the individual, store in the data store a detected indicator as a record of establishing the individual identity of the individual.

15. The method of claim 1, wherein executing the instructions further causes the device to, responsive to establishing the individual identity of the individual, record in the data store a present indicator that indicates a current presence of the individual.

16. The method of claim 15, wherein executing the instructions further causes the device to, responsive to storing the present indicator indicating the current presence of the individual, and upon subsequently failing to match a detected biometric measurement with the established biometric measurement of the individual within a selected period, replace the present indicator in the data store with an absent indicator that indicates a current absence of the individual.

17. The method of claim 1, wherein:
the representation of a visual feature of a device that is associated with the individual is further associated with an evidentiary weight of establishing the individual identity of the individual; and
establishing the individual identity of the individual further comprises: determining that matching the detected biometric measurement with the established biometric measurement, and matching the image of the individual device with the visual feature of the device according to the evidentiary weight of the device, together establish the individual identity of the individual.

18. The method of claim 17, wherein the evidentiary weight is further determined according to a detected frequency of the possession of the device by the individual.

19. A computer that establishes identities of individuals, comprising:
a processor;
a biometric detector;
a camera; and
a memory storing instructions that, when executed by a processor, provide a system comprising:
a data store comprising an individual profile of an individual identity, the individual profile comprising, as individual identifiers that establish the identity of the individual:

an established biometric measurement exhibited by the individual; and a representation of a visual feature of a device that is associated with the individual;

an individual identifier that, during a presence of an individual in possession of an individual device, identifies the individual by:

using the biometric detector, detecting a detected biometric measurement exhibited by the individual;

matching the detected biometric measurement with the established biometric measurement in the individual profile;

using the camera, capturing an image of the individual device;

matching the image with the representation of the visual feature of the device associated with the individual in the individual profile; and determining that matching the detected biometric measurement with the established biometric measurement, and matching the image of the individual device with the visual feature of the device, together establish the individual identity of the individual; and an individual interface that, responsive to the individual identifier establishing the individual identity of the individual, interacts with the individual according to the individual identity.

20. A system for establishes identities of individuals using a computer comprising a processor, a biometric detector, and a camera, the system comprising:

a memory storing instructions that, when executed by a processor, cause the computer to:

generate a data store comprising an individual profile of an individual identity, the individual profile comprising, as individual identifiers that establish the identity of the individual:

an established biometric measurement exhibited by the individual; and a representation of a visual feature of a device that is associated with the individual;

during a presence of an individual in possession of an individual device, identify the individual by:

using the biometric detector, detecting a detected biometric measurement exhibited by the individual;

matching the detected biometric measurement with the established biometric measurement in the individual profile;

using the camera, capturing an image of the individual device;

matching the image with the representation of the visual feature of the device associated with the individual in the individual profile; and determining that matching the detected biometric measurement with the established biometric measurement, and matching the image of the individual device with the visual feature of the device, together establish the individual identity of the individual; and responsive to the individual identifier establishing the individual identity of the individual, interact with the individual according to the individual identity.

* * * * *